United States Patent
Furuki

[11] Patent Number: 6,020,663
[45] Date of Patent: Feb. 1, 2000

[54] MOTOR HAVING ROTATIONAL-SPEED DETECTOR

[75] Inventor: Shigeru Furuki, Fukushima-ken, Japan

[73] Assignee: Alps Electric Co., Ltd., Japan

[21] Appl. No.: 09/127,306

[22] Filed: Jul. 31, 1998

[30] Foreign Application Priority Data

Aug. 1, 1997 [JP] Japan ..................................... 9-207887

[51] Int. Cl.⁷ ................................................. H02K 11/00
[52] U.S. Cl. ......................................... 310/68 B; 310/268
[58] Field of Search ................................. 310/68 B, 166, 310/168, 268, DIG. 6; 324/207.12, 207.15, 207.25, 163, 164, 165, 166, 167, 174; 73/514.39

[56] References Cited

U.S. PATENT DOCUMENTS

| | | | |
|---|---|---|---|
| 4,410,853 | 10/1983 | Ikoma | 324/167 |
| 4,461,994 | 7/1984 | MacDonald | 324/174 |
| 4,517,480 | 5/1985 | Müller | 310/68 R |
| 4,695,795 | 9/1987 | Nakamizo et al. | 324/207.15 |
| 4,803,425 | 2/1989 | Swanberg | 324/173 |
| 4,924,161 | 5/1990 | Ueki et al. | 318/567 |
| 5,019,773 | 5/1991 | Sugiura et al. | 324/166 |
| 5,079,511 | 1/1992 | Donat | 327/58 |
| 5,150,115 | 9/1992 | deJong et al. | 340/870.31 |
| 5,602,471 | 2/1997 | Muth et al. | 324/207.21 |

*Primary Examiner*—Clayton LaBalle
*Attorney, Agent, or Firm*—Brinks Hofer Gilson & Lione

[57] ABSTRACT

A motor provided with a rotational-speed detector has a driving coil for driving the motor, a driving magnetized portion, a rotational-speed detecting magnetized portion, and a detecting pattern. An even number of blocks of the detecting patterns having detecting lines are provided. A pair of blocks are displaced from each other in the rotating direction in relation to the arrangement of the N poles and the S poles of the rotational-speed detecting magnetized portion by an amount equal to one pitch between the detecting lines. An adder for adding currents flowing in the detecting lines of the respective blocks is provided. Alternatively, a subtracter for calculating a difference between currents flowing in the above-mentioned detecting lines is provided. Due to magnetic flux from the driving coil, noise currents are generated in the connecting lines for connecting the detecting line. However, noise currents IA and IB generated in the respective blocks A and B cancel each other. Absolute values of rotational-speed detecting signals Ia and Ib are added. Accordingly, an adverse influence of the magnetic flux generated from the driving coil is eliminated, thereby stabilizing the level of the rotational-speed detection output. The rotational speed of the motor is thus controlled with high precision.

4 Claims, 5 Drawing Sheets

MOTOR HAVING ROTATIONAL-SPEED DETECTOR

BACKGROUND OF THE INVENTION

1. Field of the Invention

The present invention generally relates to driving motors for use in, for example, floppy disk drives, and more particularly, to a motor provided with a detector for detecting the rotational speed of a rotor.

2. Description of the Related Art

FIG. 6 partially illustrates the internal structure of a typical known motor, and more specifically, illustrates the relationship between a driving slot unit 20 and a FG pattern 30, which is provided for detecting the rotational speed of a motor. The slot unit 20 is formed by winding driving coils 7 around rod-like iron-core yokes 6. A total of twelve slots are radially provided at a regular pitch having an angle of 30° and are fixed on a stator substrate. In the FG pattern 30, radially extending detecting lines 13 are formed in a zigzag shape, and a line 31 is extended on the outer side of the detecting lines 13 in the circumferential direction. One end of the FG pattern 30 is connected to a ground, and one end of the line 31a serves as an output portion.

Referring to FIG. 1, a disk-like rotor 3 is rotatably provided on the FG pattern 30 (12 in FIG. 1), and a ring-like rotor magnet 8 is fixed on the peripheral portion of the rotor 3. Formed on the surface of the rotor magnet 8 facing the FG pattern 30 is a rotational-speed detecting magnetized portion 10 in which N poles and S poles are alternately magnetized at the same pitch as that of the detecting lines 13. Also provided on the surface of the rotor magnet 8 facing the forward end of the slot unit 20 is a driving magnetized portion 9 in which N poles and S poles are alternately formed at a pitch wider than that of the rotational-speed detecting magnetized portion 10.

The motor illustrated in FIG. 6 is a three-phase motor. Upon supplying U-, V-, and W-phase alternating currents having a 120° phase difference to the driving coils 7 of the slot unit 20, the rotor magnet 8 is rotated in a single direction (clockwise in FIG. 6) due to the relationship between the iron yokes 6 magnetized by the driving coils 7 and the magnetic poles of the driving magnetized portion 9. Then, the rotational-speed detecting magnetized portion 10 also rotates over the FG pattern 30 to generate a current in the detecting lines 13 due to a change in the magnetic flux, thereby obtaining a frequency generating (FG) signal from the above-described output portion 31a. Based on this FG signal, the frequency of a driving current to be supplied to each driving coil 7 is adjusted, thereby controlling the rotational speed of the motor.

FIG. 7 schematically illustrates the flow of a current in the known FG pattern 30. The FG pattern 30 has detecting lines 13 and an outer peripheral line 13a and an inner peripheral line 13b for connecting adjacent detecting lines 13. As discussed above, the FG pattern 30 generates a current based on a change in the magnetic flux due to the rotation of the rotational-speed detecting magnetized portion 10 over the FG pattern 30, thereby obtaining a FG signal. In practice, however, since the slot unit 20 and the FG pattern 30 are placed in proximity with each other, noise is disadvantageously superimposed on the FG pattern 30 from the magnetic flux of the slot unit 20.

A driving alternating current is supplied to each driving coil 7, and the magnetic field of the slot unit 20 is altered in response to a change in the amplitude of the alternating current. A change in the magnetic field induces a current in the FG pattern 30, thereby superimposing noise on a FG signal. Among the unwanted currents generated in the FG pattern 30, the direction of a current a01 is reverse to that of a current a02 in the FG pattern 30, thereby being canceled by the other. In the lines 13a and 13b, however, currents a1, a2, a3, a4, . . . indicated by the white arrows in FIG. 7, all of which are oriented in the same direction in the FG pattern 30, are momentarily generated, thereby appearing as noise. On the other hand, in the example shown in FIG. 7, a current c indicated by the black arrow is momentarily generated in the line 31 extending outside the detecting lines 13 due to a change in the magnetic field of the slot unit 20. The direction of the current c is reverse to that of the added current $(a1+a2+a3+a4+\ldots)$ generated in the lines 13a and 13b, and the currents are thus offset. In this manner, hitherto, by providing the additional line 31 on the outer side of the detecting lines 13 for the FG pattern 30, the superimposition of noise on a FG signal caused by a magnetic field of the slot unit 20 is prevented.

In the example illustrated in FIG. 7, however, it is necessary to form the additional line 31 on the outer side of the detecting lines 13 and the outer and inner lines 13a and 13b, which are formed in a zigzag shape on the whole. This inevitably increases the diameter of the FG pattern 30 and accordingly enlarges the overall motor. Additionally, the wiring of the FG pattern 30 becomes complicated, thereby increasing the manufacturing cost of the FG pattern 30. Thus, the miniaturization of the motor, which has been increasingly demanded according to recent trends, is hampered.

FIG. 7 also reveals that the line 31 is positioned farther away from the slot unit 20 than the lines 13a and 13b of the FG pattern 30. Accordingly, the current generated in the line 31 becomes smaller than the current induced in the lines 13a and 13b, thereby failing to completely eliminate the unwanted currents, which appear as noise in the FG pattern 30.

SUMMARY OF THE INVENTION

Accordingly, in order to solve the above-described problems, it is an object of the present invention to provide a miniaturized motor having a rotational-speed detector in which noise generated in a FG pattern (detecting pattern) is suppressed without forming the FG pattern being complicated.

It is another object of the present invention to provide a motor having a rotational-speed detector that is able to detect the rotational speed with higher precision by increasing the level of detecting a frequency generating signal generated in the FG pattern.

In order to achieve the above objects, according to the present invention, there is provided a motor having rotational-speed detection means. The motor includes a stator. A rotor is rotatably provided on the stator. A driving coil is provided adjacent to the stator. A driving magnetized portion is provided adjacent to the rotor and has N poles and S poles that are alternately magnetized in the circumferential direction at a regular pitch. A rotational-speed detecting magnetized portion is provided adjacent to the rotor and has N poles and S poles that are alternately magnetized in the circumferential direction at a regular pitch. A detecting pattern is provided adjacent to the stator in such a manner that it faces the rotational-speed detecting magnetized portion. The detecting pattern, which is formed in a zigzag shape, has radially extending detecting lines, in accordance with a pitch between each of the N poles and each of the S poles of the rotational-speed detecting magnetized portion. An even number of blocks of the detecting patterns having a predetermined number of detecting lines are provided, and a pair of blocks are displaced from each other in a rotating direction in relation to the arrangement of the N poles and the S poles of the rotational-speed detecting magnetized portion by an amount equal to one pitch between each of the N poles and each of the S poles of the detecting pattern. The motor further includes means for canceling currents flowing in the respective blocks.

In the aforementioned motor, a first portion between the pair of blocks may serve as a ground potential. Then, the motor may further include addition means for adding a current flowing in the first portion and a current flowing in a second portion placed opposite to the first portion. Alternatively, ends of the respective blocks facing in the same direction may serve as ground potentials. Then, the motor may further include subtraction means for canceling a current flowing in the first portion and a current flowing in a second portion placed opposite to the first portion.

Further, in the aforementioned motor, a pair of blocks may have the same number of driving coils to which the same phase of driving currents is supplied. The driving coils may face each other in the respective blocks.

The motor of the present invention may be a three-phase or two-phase motor. The driving coil may be wound around an iron core or used singly placed on the stator as a coreless motor.

In the present invention, as discussed above, an even number of the detecting patterns (FG patterns), for example, two blocks or four blocks, are provided. Then, addition means or subtraction means are provided to cancel currents flowing in a pair of blocks. Accordingly, any noise superimposed on the lines of the FG pattern due to an alternating current flowing in the driving coil can be canceled between the two blocks. As a pair of blocks, the blocks are displaced from each other in the rotating direction in relation to the arrangement of the N poles and the S poles of the rotational-speed detecting magnetized portion by an amount of one pitch of the detecting lines (one space between the boundaries of each N pole and each S pole of the rotational-speed detecting magnetized portion). Thus, currents that are momentarily induced by the rotational-speed detecting magnetized portion are added. Namely, the level of rotational-speed signals (FG signals) obtained by the detecting pattern is doubled without canceling each other when they are added, thereby enhancing detection precision (detection sensitivity) of the FG pattern.

DESCRIPTION OF THE PREFERRED EMBODIMENTS

A motor of the present invention is described in detail with reference to FIGS. 1 through FIG. 5. A motor constructed in accordance with an embodiment of the present invention is now discussed below.

Figure 1:
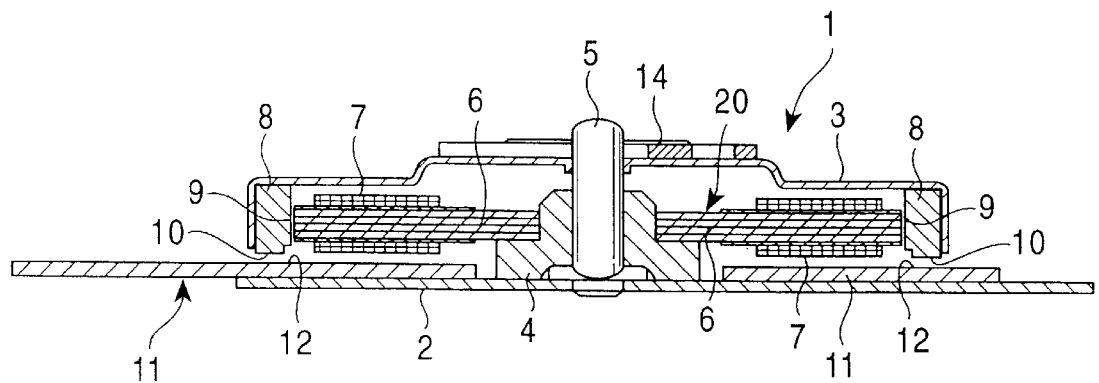
FIG. 1 is a sectional view illustrating the structure of a motor according to an embodiment of the present invention.

Referring to the sectional view of FIG. 1, a motor generally indicated by 1 is configured in the following manner. A bearing 4 is fixed on a flat stator substrate 2, and a rotation shaft 5 fixed at the center of a circular rotor 3, which is formed in the shape of an inverted tray, is rotatably supported by the bearing 4. A slot unit 20 is secured on the stator substrate 2 in such a manner that it faces the rotor 3. A turntable 14 for placing a disk, which serves as an information recording medium, is mounted on the surface of the rotor 3 opposite to the surface facing the stator substrate 2.

Figure 2:
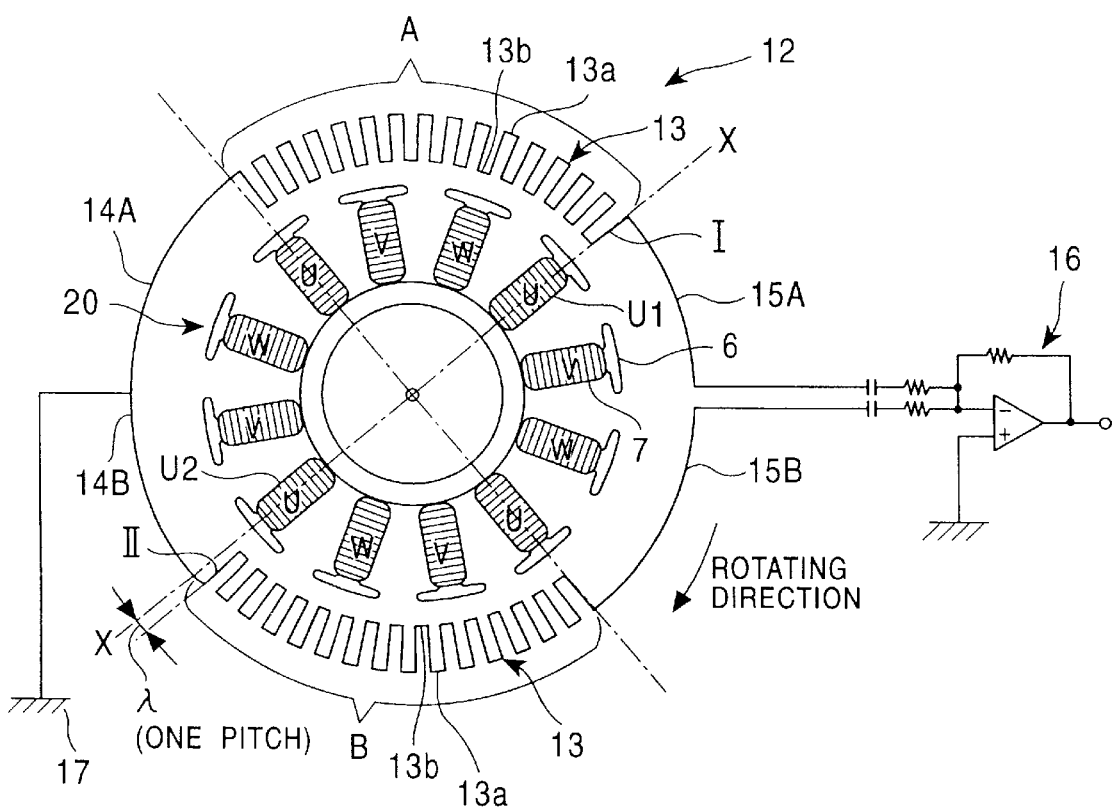
FIG. 2 is a plan view illustrating a rotational-speed detector (stator) of a motor according to an embodiment of the present invention.

The slot unit 20 is formed, as illustrated in the plan view of FIG. 2, of twelve radially extending iron-core yokes 6 and driving coils 7 wound around the center lines of the respective yokes 6. The slot unit 20 shown in FIG. 2 is for use in, for example, a three-phase motor, and is formed by sequentially and alternately arranging U-, V-, and W-phase yokes 6 with the corresponding coils 7. Driving currents having a phase difference of 120° are supplied to the respective U-, V-, and W-phase driving coils 7.

A flexible substrate 11 has a pattern which is formed by etching copper foil on the surface of the stator substrate 2 that faces the rotor 3. This pattern serves as a frequency generator (FG) pattern 12 used for detecting the number of rotations, and is arranged along a rotor magnet 8 (described later) formed on the peripheral portion of the rotor 3. The FG pattern 12 shown in FIG. 2 is formed of a pair of blocks (block A and block B) and has radially extending detecting lines 13 arranged at a regular pitch. Adjacent detecting lines 13 are connected to each other by an outer peripheral line 13a and an inner peripheral line 13b alternately. As a consequence, the FG pattern 12 is formed in a zigzag shape.

A rotor magnet 8 is fixed inside the peripheral portion of the rotor 3. Referring to the perspective view of the rotor magnet 8 in FIG. 4, a driving magnetized portion 9 is formed on the inner peripheral portion of the magnet 8 on the surface facing the forward end of the slot unit 20, and a rotational-speed detecting magnetized portion 10 is formed on the surface of the magnet 8 facing the FG pattern 12. Although in the rotor magnet 8 illustrated in FIG. 4 the driving magnetized portion 9 and the rotational-speed detecting magnetized portion 10 are formed on the same magnet 8, they may be formed on different magnets.

In the driving magnetized portion 9, N poles and S poles are alternately magnetized in the circumferential direction at a regular pitch. In the rotational-speed detecting magnetized portion 10, N poles and S poles are alternately magnetized in the circumferential direction at a regular pitch which is narrower than the pitch set in the driving magnetized portion 9. For example, the total number of magnetic N and S poles of the driving magnetized portion 9 is 16, while the total number of magnetic N and S poles of the rotational-speed detecting magnetized portion 10 is 120.

The pitch of the N poles and the S poles formed on the rotational-speed detecting magnetized portion 10 is equal to that of the radially extending detecting lines 13 of the FG pattern 12. Namely, the pitch between the boundaries of the N poles and the S poles of the rotational-speed detecting magnetized portion 10 is the same as the pitch between the detecting lines 13. Consequently, when the N pole of the rotational-speed detecting magnetized portion 10 faces any of the detecting lines 13, the S pole of the magnetized portion 10 inevitably faces the detecting line 13 adjacent to the line 13 facing the above N pole.

The FG pattern 12 has a pair of blocks A and B, as shown in FIG. 2, which are provided around the slot unit 20 and are connected in parallel to each other. One portion between the blocks A and B serves as a ground potential 17, while the other portion between the blocks A and B is connected to an adder 16. In the adder 16, a current flowing in one end of the block A and a current flowing in one end of the block B are converted into voltages, which are then added.

In the FG pattern 12, the phase of the block A facing the arrangement of the corresponding slots is different from the phase of the block B facing the arrangement of the corresponding slots. Namely, the phase of the block B is displaced counterclockwise from the phase of the block A by an amount equal to one pitch ($\lambda$) of the detecting line 13. For example, when the center line connecting a slot U1 (which is supplied with a U-phase driving current) and a slot U2 (which is also supplied with a U-phase driving current), which are displaced from each other at 180°, is indicated by X—X, the block A and the block B are displaced from each other with respect to the center line X—X by an amount equal to one pitch of the detecting line 13.

Figure 3A:
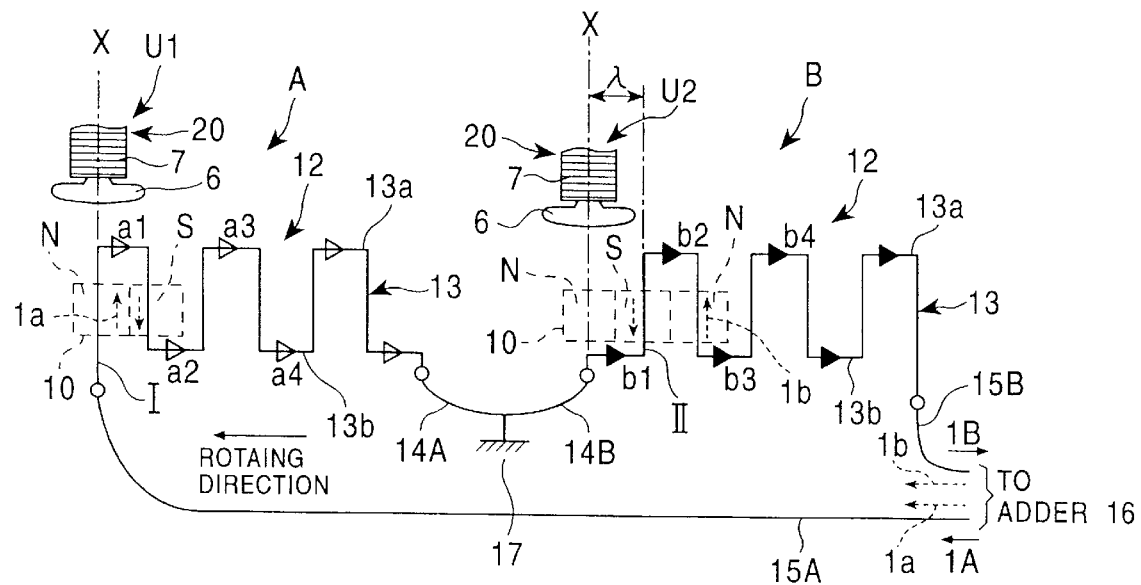
FIG. 3A is an exploded view illustrating the flow of a current of the FG pattern shown in FIG. 2 according to an embodiment of the present invention.

FIG. 3A is an exploded view illustrating the relationship of the slot U1 and the slot U2 on line X—X to the block A and the block B of the FG pattern 12. FIG. 3A shows that the block A and the block B are displaced from each other by an amount equal to one pitch of the detecting line 13 in relation to the slot U1 and the slot U2, respectively, to which the same U-phase current is supplied. At a point while the rotor 3 is rotating, the same pole of the rotational-speed detecting magnetized portion 10 is positioned on the line X—X. Accordingly, the block A and the block B are displaced from each other, as illustrated in FIG. 3A, also in relation to the respective magnetic poles of the rotational-speed detecting magnetized portion 10 by an amount of one pitch of the detecting line 13. When the detecting line 13 that is farthest along the block A in the clockwise direction is indicated by I, and the detecting line 13 that is farthest along the block B in the clockwise direction is represented by II, the lines I and II face different magnetic poles of the rotational-speed detecting magnetized portion 10.

The block A and the block B of the FG pattern 12 have the same number of detecting lines 13 (each having thirty), and the same number of slots (driving coils 7) to which the driving current having the same phase is supplied.

The operation of the motor 1 and the detecting operation of the FG pattern 12 are now described below.

U-, V-, and W-phase driving currents are supplied to the driving coils 7 of the slots so as to rotate the rotor 3 clockwise as viewed from the plan view of FIG. 2, due to the relationship between the magnetization of the iron-core yokes 6 of the slots and the magnetic poles of the driving magnetized portion 9 of the rotor magnet 8.

A discussion is given of noise components generated from the slot unit 20 to the FG pattern 12 while the rotor 3 is rotating. Upon supplying a driving alternating current to the driving coil 7 of the slot unit 20, a magnetic field generated from the iron-core yoke 6 is altered in response to a change in the amplitude of the alternating current. For example, due to a change in the magnetic field of the slot U1, noise currents a1, a2, a3, . . . indicated by the white arrows are momentarily generated in the connecting lines 13a and 13b of the block A of the FG pattern 12. Also, due to a change in the magnetic field of the slot U2, noise currents b1, b2, b3, . . . represented by the black arrows are generated in the connecting lines 13a and 13b of the block B. Noise currents are similarly generated due to the slots to which V- and W-phase driving currents are supplied. For the purpose of brevity, however, only noise currents induced by the slots U1 and U2 are now discussed.

Figure 7:
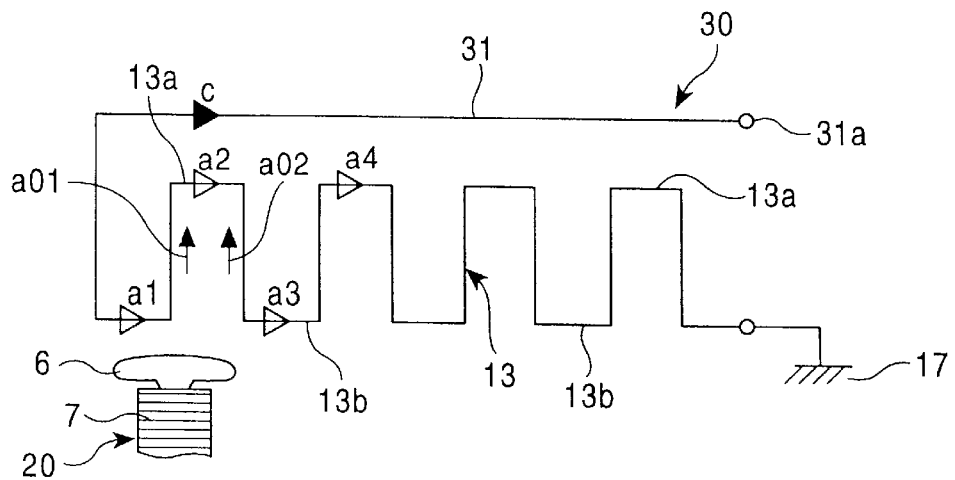
FIG. 7 illustrates the flow of a current of a known FG pattern.

It should be noted, as illustrated in FIG. 7, that noise currents a01 and a02, which are radially generated in the detecting lines 13 due to a change in the magnetic field of the slot unit 20, cancel each other in adjacent detecting lines 13 of the block A and the block B of the FG pattern 12. Thus, currents a01 and a02 are safely ignored.

In the block A, a noise current IA obtained from a total of the currents a1, a2, and a3, . . . momentarily flows into the ground potential 17 via a line 15A and a line 14A. In the block B, a noise current IB obtained from a total of the currents b1, b2, b3, . . . flows into a line 15B via a line 14B. Namely, in the lines 15A and 15B, the directions of the noise currents IA and IB are reverse to each other (180° out of phase). Thus, the noise currents IA and IB offset each other by being added in the adder 16. Although the magnitude and the direction of the noise current are occasionally changed according to the phase of alternating current supplied to the driving coils 7, the noise currents are reliably canceled in the block A and the block B regardless of the phase.

While the rotor magnet 8 is rotating, a speed detection signal (frequency generating (FG) signal) based on the rotation of the rotational-speed detecting magnetized portion 10 is generated in the FG pattern 12. As discussed above, the block A and the block B are displaced from each other in the rotating direction with respect to the arrangement of the S poles and the N poles of the rotational-speed detecting magnetized portion 10 by an amount equal to one pitch of the detecting line 13. Accordingly, when the N pole of the rotational-speed detecting magnetized portion 10 faces detecting line I of the block A at a certain point, the S pole of the rotational-speed detecting magnetized portion 10 faces detecting line II of the block B. At this moment, a FG signal Ia detected in the block A of the FG pattern 12 is transmitted from the line 15A to the line 14A, while a FG signal Ib detected in the block B is transmitted from the line 15B to the line 14B. Conversely, when the S pole of the rotational-speed detecting magnetized portion 10 faces detecting line I, the N pole faces detecting line II. In this case, the signal Ia and the signal Ib flow in the direction reverse to the above-described direction.

Figure 5A:
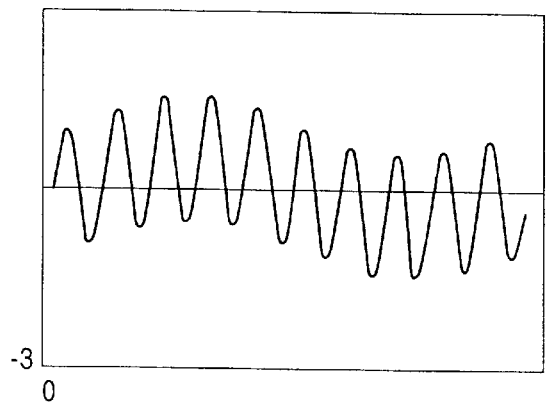
FIG. 5A is a waveform diagram illustrating a FG signal of a block A.
Figure 5B:
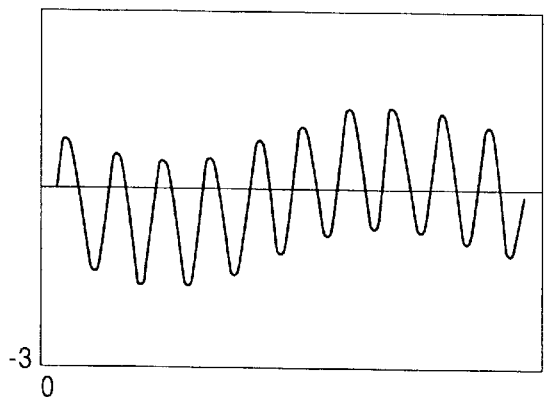
FIG. 5B is a waveform diagram illustrating a FG signal of a block B.
Figure 5C:
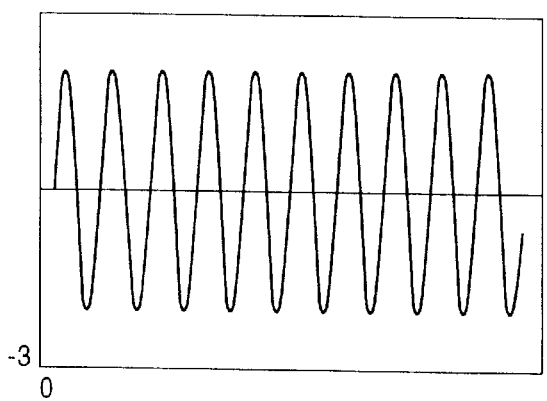
FIG. 5C is a waveform diagram illustrating a FG signal obtained by adding the FG signals shown in FIGS. 5A and 5B.
Figure 6:
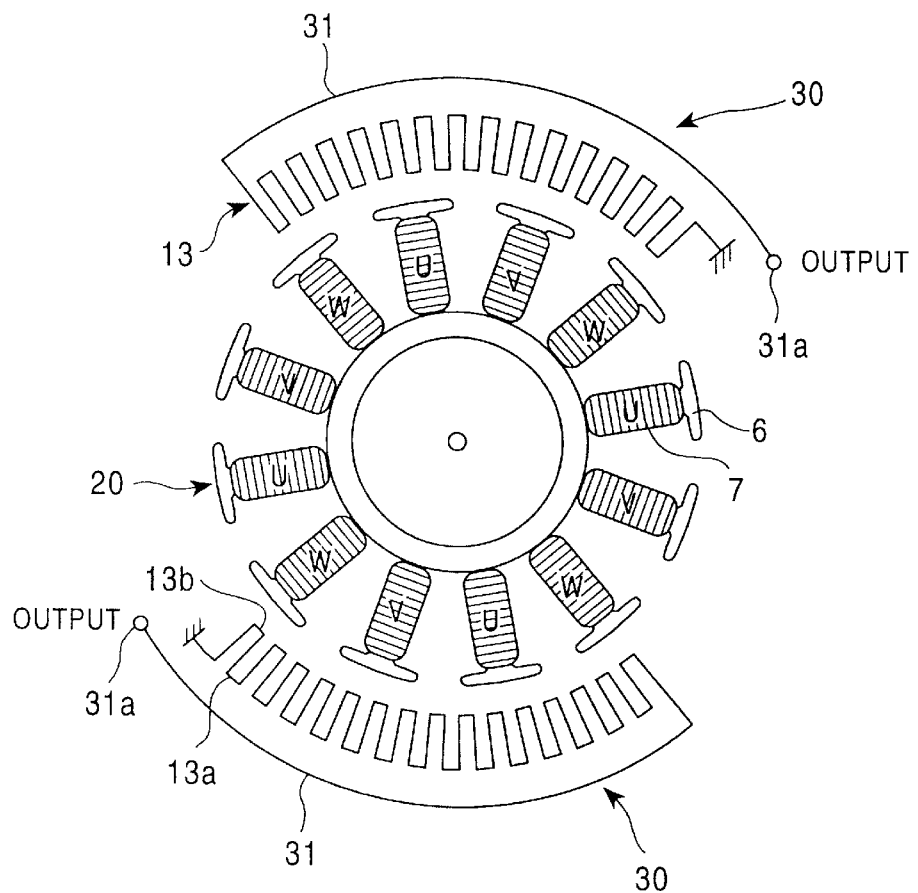
FIG. 6 is a plan view illustrating a FG pattern for use in a known motor.

However, since the FG signals Ia and Ib, which serve as a rotational-speed detection signal, in the lines 15A and 15B constantly flow in the same direction (in phase), the level of Ia and Ib is doubled when they are added in the adder 16. More specifically, FIG. 5A illustrates a FG signal obtained from the block A, while FIG. 5B illustrates a FG signal obtained from the block B. When the signals are added, their level is doubled, as illustrated in FIG. 5C. Further, FIGS. 5A and 5B reveal that the level of each FG signal is fluctuated according to the frequency supplied to the driving coils 7 due to a magnetic field from the slot unit 20. Such fluctuations, however, cancel each other in the block A and the block B. As shown in FIG. 5C, the superimposition of noise on the added FG signal caused by a magnetic field is prevented.

Another embodiment of the present invention will now be described with reference to FIG. 3B. This embodiment is similar to the previous embodiment shown in FIG. 3A in the relationship of the blocks A and B of the FG pattern 12 to the slots U1 and U2, and in the relationship of the blocks A and B to the rotational-speed detecting magnetized portion 10. However, this embodiment differs from the previous embodiment in the following respects. The lines 15A and 14B connected to the ends farthest along the respective blocks A and B serve as ground potentials, while the line 14A and the line 15B extending from the other ends of the respective blocks A and B are connected to subtraction means 26. The subtraction means 26 is used for subtracting a current of the line 14A or 15B from the other line or for converting both currents to voltages to calculate a difference.

Figure 3B:
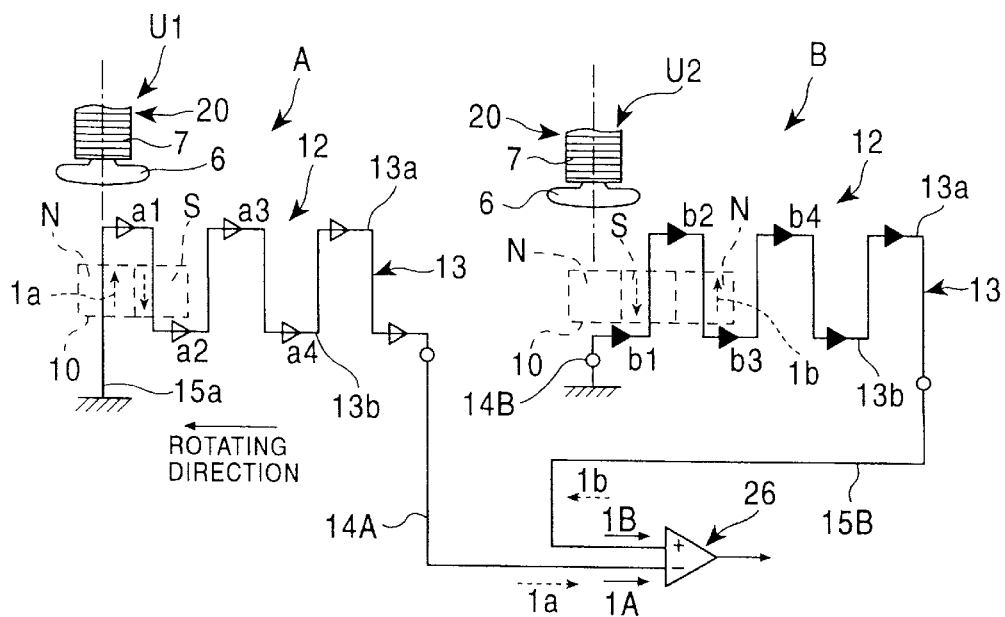
FIG. 3B is an exploded view illustrating the flow of a current of a FG pattern according to another embodiment of the present invention.
Figure 4:
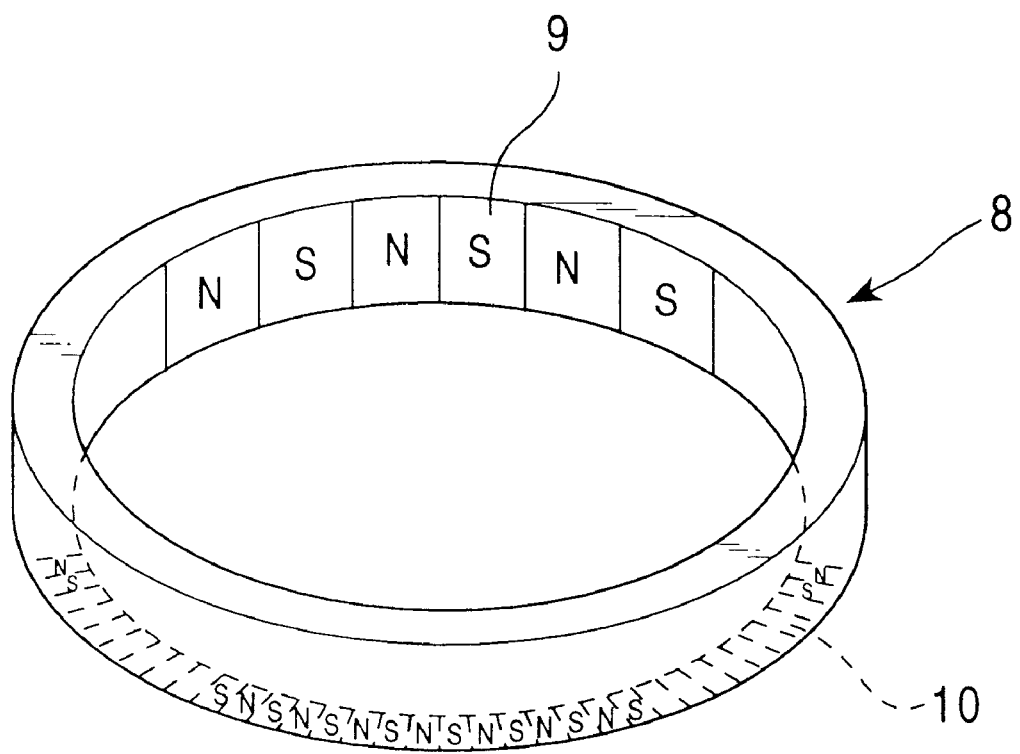
FIG. 4 is a perspective view illustrating a rotor magnet.

In the embodiment illustrated in FIG. 3B, the direction of the noise current IA generated from the slot U1 and superimposed on the block A is always the same as the direction of the noise current IB generated from the slot U2 and superimposed on the block B, i.e., the noise currents IA and IB are in phase with each other. Accordingly, the currents IA and IB are offset with each other by the subtraction means 26. Conversely, the direction of the FG signal Ia generated in the block A and flowing in the line 14A is reverse to the direction of the FG signal Ib produced in the block B and flowing in the line 15B, i.e., the signals Ia and Ib are 180° out of phase. Thus, the absolute values of the FG signal Ia and Ib are added in the subtraction means 26. As a consequence, in this embodiment shown in FIG. 3B, as well as in the previous embodiment illustrated in FIG. 3A, the same FG signal shown in FIG. 5C can be obtained.

As discussed above, the relative position of the block A and the block B of the FG pattern 12 is first correctly adjusted. Then, the block A and the block B are displaced from each other by an amount equal to one pitch ($\lambda$) of the FG pattern 12 in either rotating direction. This makes it possible to cancel only noise components without eliminating required FG signals. Namely, the pitch of the FG pattern 12 is, in general, much narrower than the pitch of the slot unit 20. Therefore, required FG signals are reliably obtained even with a displacement of one pitch without hampering the effect of canceling noise components.

In the motor of the present invention, although two blocks of the FG pattern 12 are provided, any even number of blocks, for example, two or four blocks may be provided. A slot unit having only driving coils may be used without providing iron-core yokes. Further various modifications and equivalent arrangements may be made without departing from the spirit and scope of the invention.

As is seen from the foregoing description, a motor having a rotational-speed detector of the present invention offers the following advantages. It is possible to cancel only noise caused by an influence of magnetic flux generated from a driving coil on a detecting pattern without eliminating a FG signal obtained from the relationship between the detecting pattern and a rotational-speed detecting magnetized portion. Additionally, a stabilized FG signal with a greater waveform is obtained, thereby making it possible to detect the rotational speed of a rotor with high precision and high sensitivity. Further, the detecting pattern is simply formed in a zigzag shape without needing to form an additional pattern on the outer side of the detecting pattern. Thus, the overall motor can be miniaturized.

What is claimed is:

1. A motor provided with rotational-speed detection means, comprising:

a stator;

a rotor rotatably provided on said stator;

a driving coil provided adjacent to said stator;

a driving magnetized portion provided adjacent to said rotor and having N poles and S poles that are alternately magnetized in the circumferential direction at a regular pitch;

a rotational-speed detecting magnetized portion provided adjacent to said rotor and having N poles and S poles that are alternately magnetized in the circumferential direction at a regular pitch; and a detecting pattern provided adjacent to said stator in such a manner that it faces said rotational-speed detecting magnetized portion, said detecting pattern, which is formed in a zigzag shape, having radially extending detecting lines, in accordance with a pitch between each of the N poles and each of the S poles of said rotational-speed detecting magnetized portion, wherein an even number of blocks of said detecting patterns having a predetermined number of said detecting lines are provided, and a pair of blocks are displaced from each other in a rotating direction in relation to the arrangement of the N poles and the S poles of said rotational-speed detecting magnetized portion by an amount equal to one pitch between each of the N poles and each of the S poles of said detecting pattern, said motor further comprising means for canceling currents flowing in the respective blocks.

2. A motor according to claim 1, wherein a first portion between the pair of blocks serves as a ground potential, said motor further comprising addition means for adding a current flowing in said first portion and a current flowing in a second portion placed opposite to said first portion.

3. A motor according to claim 1, wherein ends of the respective blocks facing in the same direction serve as ground potentials, said motor further comprising subtraction means for canceling a current flowing in said first portion and a current flowing in a second portion placed opposite to said first portion.

4. A motor according to claim 1, wherein the pair of blocks have the same number of driving coils to which the same phase of driving currents is supplied, said driving coils facing each other in the respective blocks.

* * * * *